(12) United States Patent
Lovell et al.

(10) Patent No.: US 11,449,126 B1
(45) Date of Patent: Sep. 20, 2022

(54) POWER CONTROL SYSTEMS AND METHODS FOR MACHINE LEARNING COMPUTING RESOURCES

(71) Applicant: Maxim Integrated Products, Inc., San Jose, CA (US)

(72) Inventors: Mark Alan Lovell, Lucas, TX (US); Robert Michael Muchsel, Addison, TX (US)

(73) Assignee: Maxim Integrated Products, Inc., San Jose, CA (US)

(*) Notice: Subject to any disclaimer, the term of this patent is extended or adjusted under 35 U.S.C. 154(b) by 0 days.

(21) Appl. No.: 17/335,759

(22) Filed: Jun. 1, 2021

(51) Int. Cl.
*G06F 1/32* (2019.01)
*G06F 1/3287* (2019.01)
*G06F 1/3296* (2019.01)

(52) U.S. Cl.
CPC .......... *G06F 1/3287* (2013.01); *G06F 1/3296* (2013.01)

(58) Field of Classification Search
CPC .............................. G06F 1/3287; G06F 1/3296
See application file for complete search history.

(56) References Cited

U.S. PATENT DOCUMENTS

| | | | | |
|---|---|---|---|---|
| 2019/0073585 A1* | 3/2019 | Pu | ............................ | H01L 25/18 |
| 2019/0187775 A1* | 6/2019 | Rotem | ................... | G06F 1/3287 |
| 2020/0183482 A1* | 6/2020 | Sebot | ..................... | G06F 1/3228 |

* cited by examiner

*Primary Examiner* — Stefan Stoynov
(74) *Attorney, Agent, or Firm* — North Weber & Baugh LLP; Michael North

(57) ABSTRACT

Described are context-aware low-power systems and methods that reduce power consumption in compute circuits such as commonly available machine learning hardware accelerators that carry out a large number of arithmetic operations when performing convolution operations and related computations. Various embodiments exploit the fact that power demand for a series of computation steps and many other functions a hardware accelerator performs is highly deterministic, thus, allowing for energy needs to be anticipated or even calculated to a certain degree. Accordingly, power supply output may be optimized according to actual energy needs of compute circuits. In certain embodiments this is accomplished by proactively and dynamically adjusting power-related parameters according to high-power and low-power operations to benefit a machine learning circuit and to avoid wasting valuable power resources, especially in embedded computing systems.

20 Claims, 5 Drawing Sheets

500

POWER CONTROL SYSTEMS AND METHODS FOR MACHINE LEARNING COMPUTING RESOURCES

BACKGROUND

A. Technical Field

The present disclosure relates generally to data processing in machine-learning applications. More particularly, the present disclosure relates to power control systems and methods for efficiently using machine learning compute circuits that perform large numbers of arithmetic operations.

B. Background

Machine learning is a subfield of artificial intelligence that enables computers to learn by example without being explicitly programmed in a conventional sense. Numerous machine learning applications utilize Convolutional Neural Networks (CNNs) that are supervised networks capable of solving complex image classification and semantic segmentation tasks. A CNN uses as input large amounts of multi-dimensional training data, e.g., image or sensor data, to learn prominent features therein by using and reusing filters with learnable parameters that are applied to the input data. In a subsequent inference phase, the CNN uses unsupervised operations to detect or interpolate previously unseen features or events in new input data to classify objects or to compute an output such as a regression, or to combine its output with the input for tasks such as noise suppression.

To perform large numbers of arithmetic computations for convolutions, oftentimes, hardware accelerators, such as embedded hardware machine learning accelerators, are used. The power consumption demands of such devices vary over a wide dynamic range that is highly dependent on various factors such as the topology of the system the accelerator operates in, the size of the CNN that is being processed and number of convolutional computations performed, the type and dimensions of data being processed, the clock speed at which computation are performed, and the like.

Internal and external power supplies, such as linear regulators or switching power supplies, commonly used to drive power-hungry hardware accelerators are dimensioned to output power on one or more fixed rail voltages. Since hardware accelerators have to perform a large number of computations in a relatively short amount of time, this oftentimes results in undesirable instantaneous current and power spikes that tend to negatively impact the lifetime of the computing hardware.

While some approaches are equipped to reduce power by setting at least some portions of a circuit into low-power mode, e.g., a sleep mode, all available power rails typically continue to operate at their nominal output voltage, i.e., at full capacity. Therefore, existing approaches cannot take advantage of lower memory supply voltages and other features presented herein that use system knowledge to intelligently reduce overall power consumption. Unlike approaches that lack contextual awareness of the type and intensity of computation steps that hardware accelerators and similar compute circuits are performing at any moment in time, and the power demands of each set of operations, certain embodies herein proactively adjust power-related parameters, e.g., according to high-power and low-power operations, in a way that benefits the machine learning circuit and avoids wasting valuable power resources, especially in embedded systems.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF EMBODIMENTS

Figure 1:
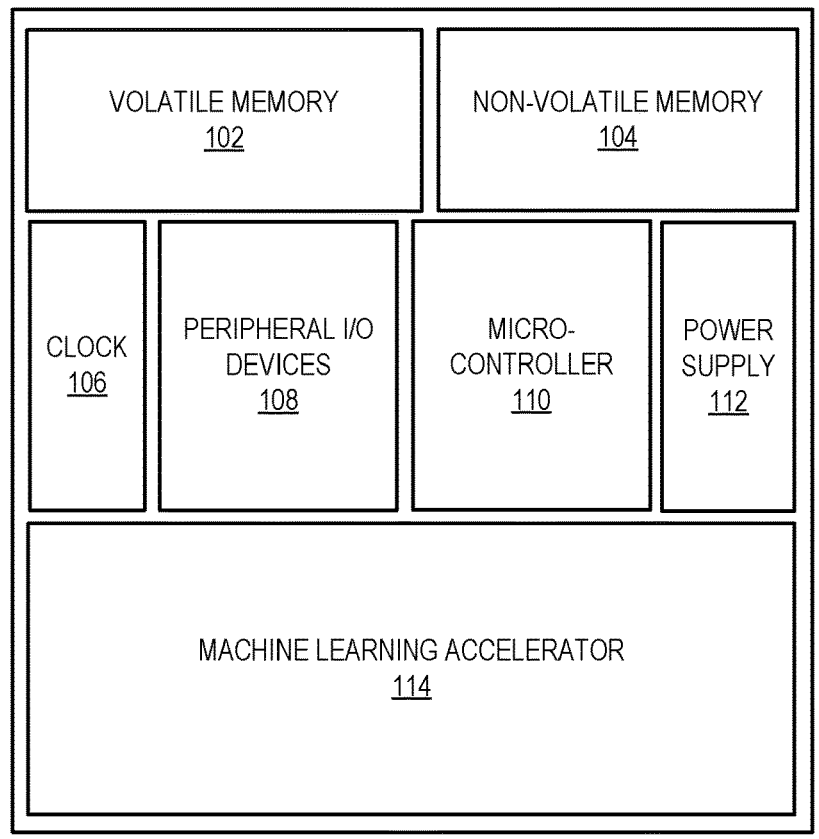
FIG. 1 is a general illustration of a conventional embedded machine learning accelerator system.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Each reference mentioned in this patent document is incorporate by reference herein in its entirety.

It shall be noted that embodiments described herein are given in the context of embedded machine learning accelerators, but one skilled in the art shall recognize that the teachings of the present disclosure are not so limited and may equally reduce power consumption in other computing systems or other devices.

FIG. 1 illustrates a conventional embedded machine learning accelerator system that processes data in multiple stages. System 100 contains volatile memory 102, non-volatile memory 104, clock 106, clock I/O peripherals, microcontroller 110, power supply 112, and machine learning accelerator 114. Microcontroller 110 can be a traditional DSP or general-purpose computing device, machine learning accelerator 114 can be implemented as a CNN accelerator that comprises hundreds of registers (not shown). As depicted in FIG. 1, machine learning accelerator 114 interfaces with other parts of embedded machine learning accelerator system 100.

In operation, microcontroller 110 performs arithmetic operations for convolutions in software, or using one or more hardware accelerators. Machine learning accelerator 114 typically uses weight data to perform matrix-multiplications and related convolution computations on input data using weight data. The weight data may be unloaded from accelerator 114, for example, to load new or different weight data prior to accelerator 114 performing a new set of operations using the new set weight data. More commonly, the weight data remains unchanged, and for each new computation, new input data is loaded into accelerator 114 to perform the computations. Machine learning accelerator 114 oftentimes performs millions of computations in a short time, which can cause power supply 112 to encounter power spikes, e.g., in the form of current spikes, that adversely impact the long-term performance of system 100, or cause the system to fail unless power supply 112 and its support circuitry is designed to handle the fastest rise in power demand under all environmental conditions (e.g., higher summer temperatures) system 100 may encounter over its lifetime.

As the amount of data subject to convolution operations increases and the complexity of operations continues to grow, so does power consumption. One of the shortcomings of power supply 112 is that it lacks any feedback mechanisms to utilize information about machine learning accelerator 114 to adapt to high and low-power operations. Thus, power supply 112 in unable to control power based on the actual power needs of the computing resources of system 100 to reduce power consumption.

Accordingly, what is needed are systems and methods that allow hardware accelerators to efficiently process large amounts of complex arithmetic operations for neural networks with low power consumption and, ideally, without increasing hardware cost.

Figure 2:
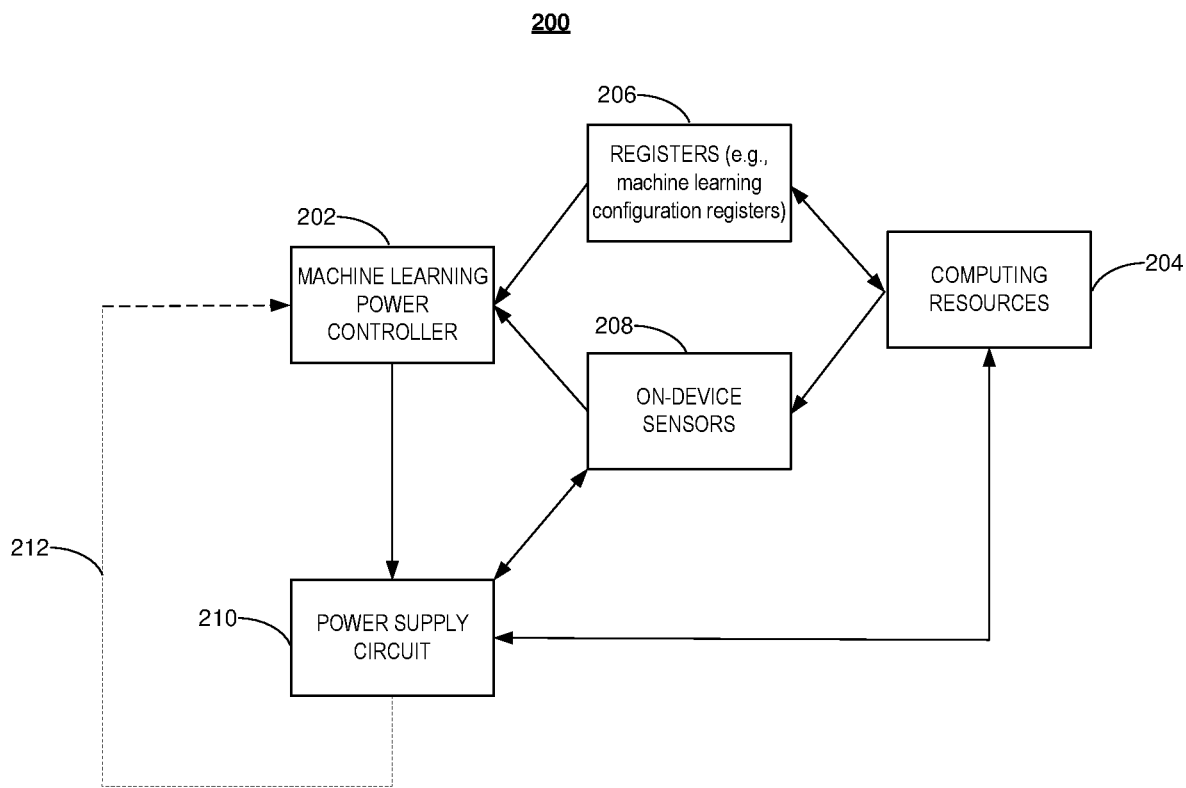
FIG. 2 illustrates an exemplary block diagram of a power control system for machine learning computing resources according to various embodiments of the present disclosure.

FIG. 2 illustrates an exemplary block diagram of a power control system that allows for a significant reduction in power consumption in machine learning computing resources according to various embodiments of the present disclosure. In embodiments, power supply system 200 may comprise machine learning power controller 202, which may comprise a state machine, computing resources 204, machine learning registers 206, e.g., one or more machine learning configuration registers, on-device sensors 208, and power supply circuitry 210.

In embodiments, computing resources 204, which may be disposed on an ASIC, an IC, a semiconductor chip or the like (not shown), and computing resources 204 may comprise computational circuitry (e.g., electrical circuitry), such as a machine learning hardware accelerator, e.g., a commonly available hardware accelerator comprising any number of memory resources. Registers 206 may be implemented using any type of storage elements known in the art. On-device sensors 208 may comprise circuitry for monitoring and/or measuring parameters associated with system 200. Exemplary parameters include hardware-related parameters, such as current or voltage and environmental parameters, e.g., temperature. Further, timing-related parameters may include clock cycles, processing times, and the like. It is noted that sub-circuits within computing resource 204 may each have their own set of sensors 208 and monitoring circuitry.

In embodiments, power supply circuit 210 may comprise any combination of external and internal power supplies, e.g., a single inductor multiple output (SIMO) power supply that may have any number of output taps to provide power to a number of different computing resources (e.g., 204) to account for varying power needs. In embodiments, employing an internal or local power supply, advantageously, simplifies power control over approaches that solely rely on external power supplies. However, this is not intended as a limitation on the scope of the present disclosure since power supply circuit 210 may comprise any number of external power supplies, e.g., a programmable multi-output switchmode power supply that may be communicatively coupled with controller 202 via feedback path 212.

In embodiments, feedback path 212 may be used to communicate information about power supply circuit 210 to machine learning power controller 202, for example, to more quickly reach a steady-state condition than would otherwise be possible when using external power supplies. The provided information may comprise, for example, a remaining power budget that may be used to cause power controller 202 to take some action, e.g., dynamically adjusting a clock speed such as to make the best use of the available power. It is noted that other and or additional metrics may be used to estimate power consumption and take appropriate action, including adjusting one or more machine learning configuration parameters of any number of computing resources 204.

In embodiments, data gathered by sensors 208 may be used to instruct a hardware accelerator or other computing resources 204 to combine or split computational operations, e.g., to use two or more sub-circuits to perform a computation. In addition, in circumstances where one or more processing units of computing resources 204 are to be turned off, processors may take over each other's tasks, e.g., processors that share common resources such as memory.

It is understood that, in embodiments, various metrics in system 200 may be quantitative and/or qualitative, local or global, and may include operational parameters such as data operations (e.g., memory access operations), e.g., number of read, write, store, and retrieve operations, steps in a calculation, etc.; timing-related parameters, such as clock cycles, processing times; environmental parameters, such as temperature data. Computational parameters may comprise type of mathematical operations; type or dimensions of data being processed, and the like. In addition, metrics may be obtained, measured, or derived directly from any computational unit or any auxiliary device, such as a sensor, or indirectly from sources internal or external to a circuit. It is further understood that circuit-related data may comprise instantaneous, averaged, or otherwise manipulated data. In embodiments, any number of metrics may be used to calculate a power demand, e.g., by using a formula that has been derived empirically or by an algorithm.

In embodiments, machine learning power controller 202 may implement a power management scheme that takes into account information such as measured (or modeled) data about computing resources 204 and their operation. Machine learning power controller 202 may cause power supply circuit 210 to adjust power delivery parameters and/or operational parameters in real-time to meet power requirements, ideally, while keeping power consumption in system 200 as low as possible.

In embodiments, software may be used to program conditions associated with various processing steps of a network model into registers 206 such that computing resources 204 may know what to expect at any given step, e.g., how long a calculation for a particular layer in a neural network model will take. In embodiments, machine learning power controller 202 may use operational and/or configuration data to adjust power delivery to computing resources 204, e.g., by turning on an auxiliary external power supply, or by causing a decrease in clock speed instead, e.g., to satisfy a temporarily high current requirement.

In embodiments, for a given neural network model, such adjustments may be performed on a layer-by-layer basis. Machine learning power controller 202 may adjust operational parameters of computing resources 204 by any method known in the art, including reducing a variable clock speed.

Various embodiments take advantage of the fact that many functions of a hardware accelerator are highly deterministic in order to anticipate energy needs for at least some of computing resources 204 for any given time period and control power supply circuit 210 in a manner such as to optimize output power provided by power supply circuit 210 based on actual energy needs. In embodiments, machine learning power controller 202 may, based on predetermined parameters and instantaneous data, such as type of operation, computing resources 204, and number of expected or calculated computations, anticipate energy demand for any number of power supplies and adjust parameters, such as power supply voltages and output currents, in an energy-efficient way, e.g., while protecting components in system 200 from overcurrent and other potentially harmful conditions. As an example, given a trained neural network model, the occurrence of certain types of computational operations, such as a sum-of-products or multiplication operations, are relatively easily predictable since read/write and memory access operations associated therewith are relatively easily determined. As a result, for a given architecture, power consumption of computing resources 204 may be relatively accurately estimated, i.e., power consumption may be pre-determined for a given number of operations. This remains true to a certain degree even in the presence of variances introduced by the data-dependent circuitry in computing resources 204 that makes it more difficult to account for all variations.

In embodiments, machine learning power controller 202 may utilize such pre-determinable network-related and/or hardware-related information to estimate power consumption and make power and, thus, computing resources 204 available when needed and, conversely, to save power when circumstances allow to do so. In embodiments, hardware-related data, such as clock frequency, input and output currents or voltages, may be obtained or retrieved from other available sources, and fed back to machine learning power controller 202 to enable controller 202 to adjust supply voltages for power supply circuit 210 to optimize power savings.

In embodiments, feedback may comprise data gathered by on-device sensors 208 that may be coupled to computing resources 204, e.g., a machine learning accelerator. On-device sensors 208 may measure, monitor, and deliver, e.g., timing-related feedback to power controller 202. In embodiments, power controller 202 may use the information to adjust supply voltages based on variations that may have been caused, for example, by fabrication differences or environmental factors, such as temperature changes, material aging effects, and other imperfections that may give rise to an unwanted rise in power consumption.

Conversely, manufacturing variances among computing resources 204 that may exist, e.g., batch-to-batch manufacturing variations, which may allow for a greater margin on some devices, may be exploited, for example, to increase power output, processing speed, or other performance metrics that may exceed a nominal value, thereby, taking advantage of available additional capacity.

Power supply circuit 210 may further be controlled to operate in reduced-power modes, e.g., a retention mode. In embodiments, in retention mode, neural network parameters, such as weights, may be preserved without computations taking place. Advantageously, this allows machine learning power controller 202 to utilize a low-power retention mode (also called standby or power-save mode), which is natively supported by many standard memory devices, to move some or all parameter memories into such retention mode. In embodiments, where power supply circuit 210 comprises a number of outputs or power rails, system 200 may, thus, take advantage of significantly lowering the memory supply voltage. In such embodiments, machine learning power controller 202 may even disable (e.g., by gating off) power supply to all computing resources 204.

Advantageously, these embodiments aid in significantly lowering power consumption, particularly in low duty-cycle applications, for example, where the duty-cycle may be adjusted based on load to further increase the power saving features of power supply circuit 210.

Figure 3:
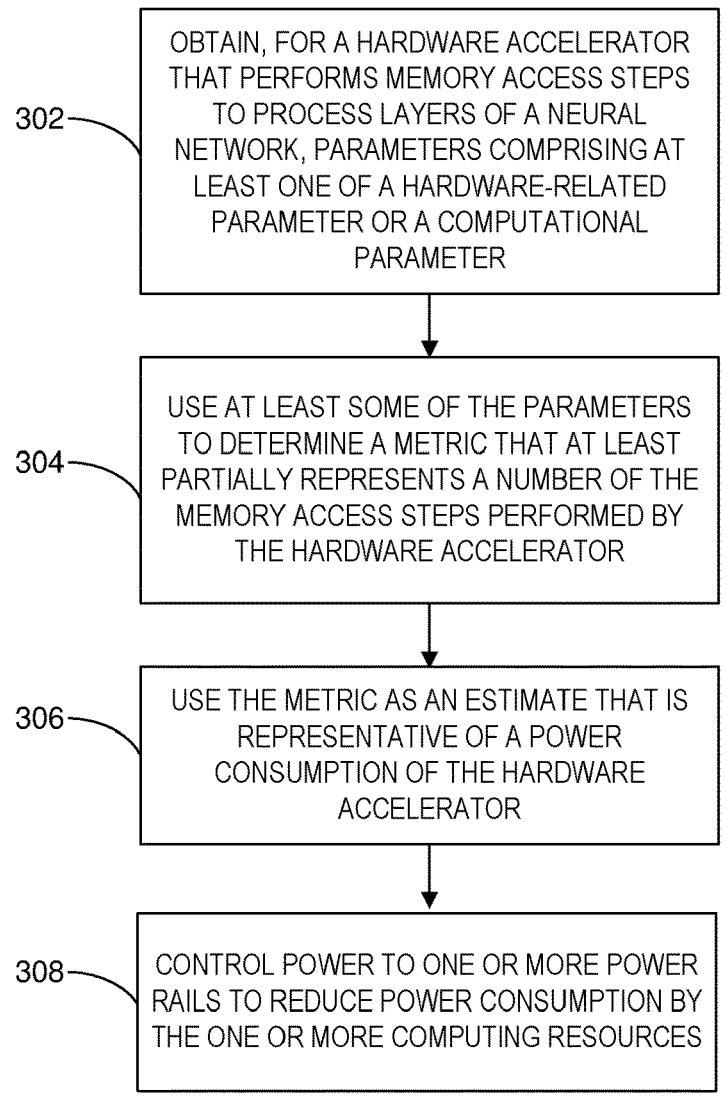
FIG. 3 is a flowchart of an illustrative process for controlling power to reduce power consumption in machine learning computing resources according to various embodiments of the present disclosure.

FIG. 3 is a flowchart of an illustrative process for controlling power to reduce power consumption in machine learning computing resources according to various embodiments of the present disclosure. In embodiments, power controlling process 300 may begin, at step 302, when parameters comprising one or more hardware-related parameters and/or one or more computational parameter are obtained for a hardware accelerator. The hardware accelerator performs memory access steps to process various layers of a neural network.

At step 304, at least some of the parameters may be used to determine a metric that at least partially represents a number of the memory access steps performed by the hardware accelerator. At step 306, the metric may be used as an estimate that is representative of a power consumption of the hardware accelerator. Finally, at step 308, power to one or more power rails may be controlled such as to reduce power consumption by the one or more computing resources.

Figure 4:
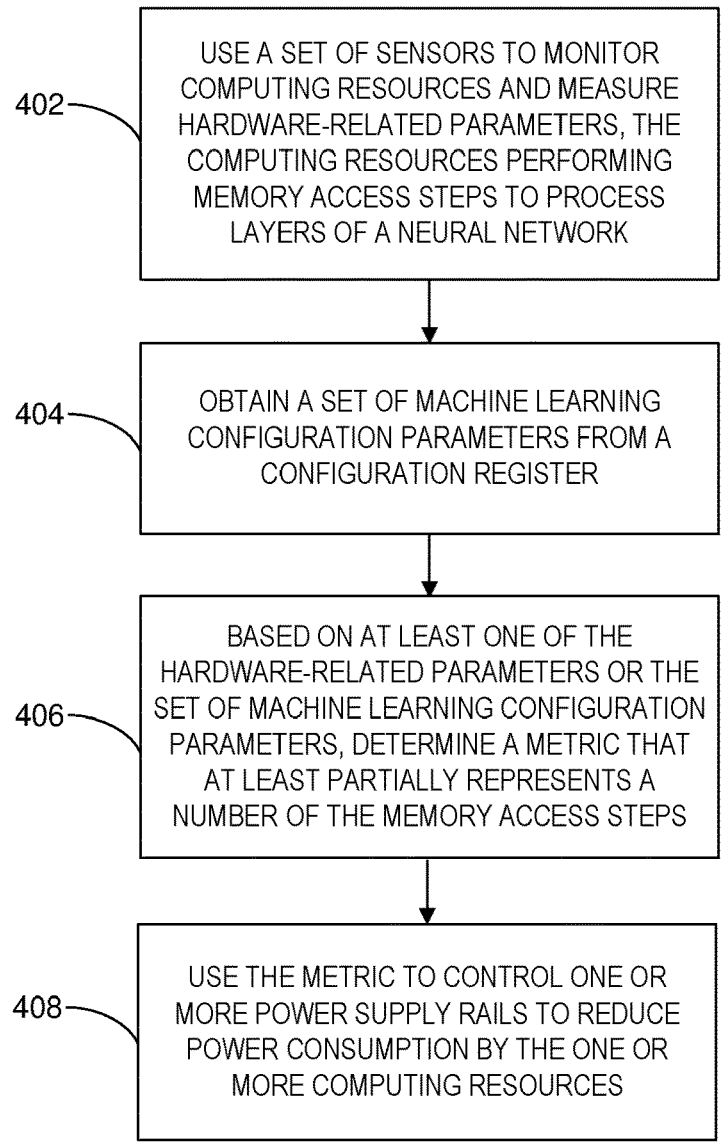
FIG. 4 is a flowchart of an alternative process for reducing power consumption in computing resources according to various embodiments of the present disclosure.

FIG. 4 is a flowchart of an alternative process for reducing power consumption in computing resources according to various embodiments of the present disclosure. Process 400 for reducing power consumption may begin, at step 402, when one or more sensors are used to monitor, e.g., for a predetermined period of time, any number of computing resources and measure hardware-related parameters, such as current, voltage, and temperature. The computing resources perform calculation steps, including memory access steps, to process layers of a neural network.

At step 404, a set of machine learning configuration parameters may be obtained, e.g., from a register, e.g., one or more machine learning configuration registers. At step 406, based on at least one of the hardware-related parameters or the set of machine learning configuration parameters, a metric may be determined, which at least partially represents a number of the memory access steps. At step 408, the metric may be used to control the one or more power supply rails to reduce power consumption by the one or more computing resources.

Figure 5:
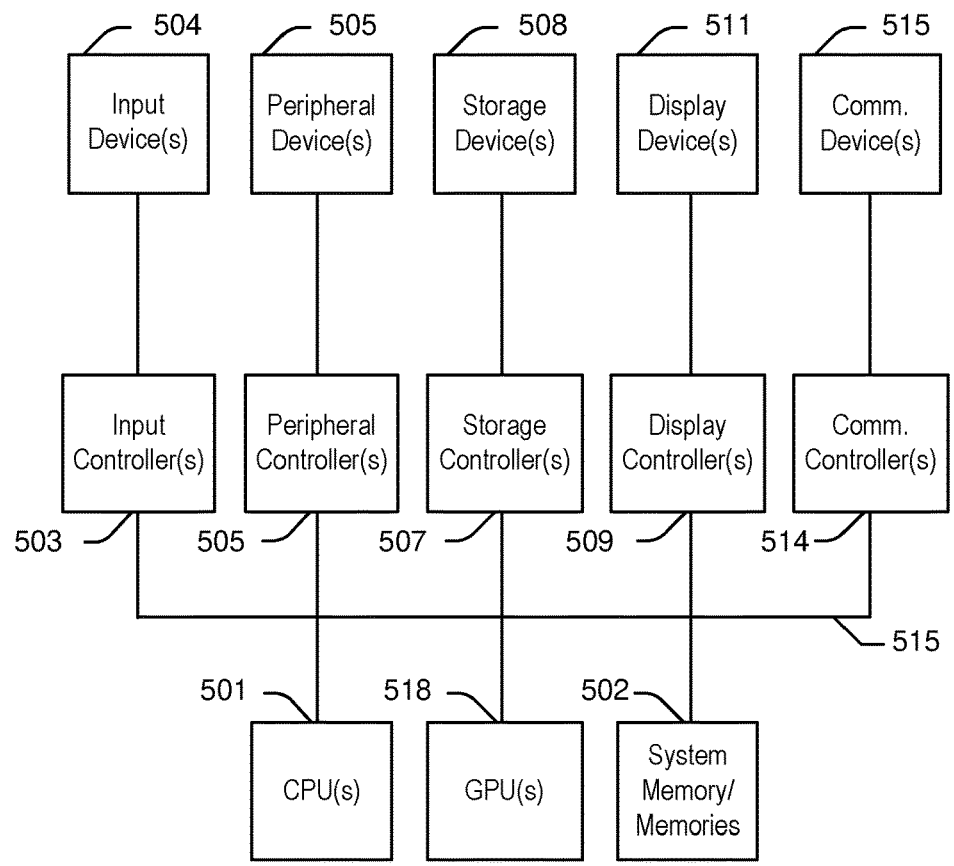
FIG. 5 depicts a simplified block diagram of a computing device/information handling system, in accordance with embodiments of the present disclosure.

FIG. 5 depicts a simplified block diagram of an information handling system (or computing system) according to embodiments of the present disclosure. It will be understood that the functionalities shown for system 500 may operate to support various embodiments of a computing system—although it shall be understood that a computing system may be differently configured and include different components, including having fewer or more components as depicted in FIG. 5.

As illustrated in FIG. 5, the computing system 500 includes one or more CPUs 501 that provides computing resources and controls the computer. CPU 501 may be implemented with a microprocessor, or the like, and may also include one or more graphics processing units 519 and/or a floating-point coprocessor for mathematical computations. System 500 may also include a system memory 502, which may be in the form of random-access memory (RAM), read-only memory (ROM), or both.

A number of controllers and peripheral devices may also be provided, as shown in FIG. 5. An input controller 503 represents an interface to various input device(s) 504, such as a keyboard, mouse, touchscreen, and/or stylus. The computing system 500 may also include a storage controller 507 for interfacing with one or more storage devices 508 each of which includes a storage medium such as magnetic tape or disk, or an optical medium that might be used to record programs of instructions for operating systems, utilities, and applications, which may include embodiments of programs that implement various aspects of the present disclosure. Storage device(s) 506 may also be used to store processed data or data to be processed in accordance with the disclosure. The system 500 may also include a display controller 509 for providing an interface to a display device 511, which may be a cathode ray tube (CRT), a thin film transistor (TFT) display, organic light-emitting diode, electroluminescent panel, plasma panel, or other type of display. The computing system 500 may also include one or more peripheral controllers or interfaces 505 for one or more peripherals 506. Examples of peripherals may include one or more printers, scanners, input devices, output devices, sensors, and the like. A communications controller 514 may interface with one or more communication devices 515, which enables the system 500 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. Processed data and/or data to be processed in accordance with the disclosure may be communicated via the communications devices 515. For example, loader circuit 505 in FIG. 5 may receive configuration information from one or more communications devices 515 coupled to communications controller 514 via bus 516.

In the illustrated system, all major system components may connect to a bus 516, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium comprising, for example, magnetic media such as hard disks, floppy disks, and magnetic tape; optical media such as CD-ROMs and holographic devices; magneto-optical media; and hardware devices that are specially configured to store or to store and execute program code, such as ASICs, programmable logic devices (PLDs), flash memory devices, and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as ASICs, PLDs, flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A power control system for machine learning computing resources, the power control system comprising:
    one or more registers for storing machine learning configuration parameters;
    one or more computing resources coupled to obtain the machine learning configuration parameters and perform memory access steps to process layers of a neural network;
    one or more power supply rails coupled to the computing resources;
    on-device sensors coupled to the one or more computing resources to monitor hardware-related parameters; and
    a machine learning power controller coupled to receive the hardware-related parameters and the machine learning configuration parameters, the machine learning power controller determines a metric that at least partially represents a number of the memory access steps performed by the one or more computing resources and uses the metric as an estimate representative of a power consumption of the one or more computing resources to control power to the one or more power supply rails to reduce power consumption by the one or more computing resources.

2. The system according to claim 1, wherein the machine learning power controller uses the metric to adjust one or more machine learning configuration parameters of the one or more computing resources.

3. The system according to claim 2, wherein the one or more machine learning configuration parameters comprise at least one of a type or a number of computational operations.

4. The system according to claim 1, wherein the hardware-related parameter comprises measured data that comprises at least one of a clock speed or sensor data, the sensor data comprising at least one of a current, a voltage, a temperature, or an environmental parameter.

5. The system according to claim 4, further comprising a power supply circuit that uses at least some of the measured data to adjust an output power at the one or more power rails to exceed a threshold while maintaining a safety margin associated with the measured data.

6. The system according to claim 5, wherein the power supply circuit is implemented as a single-inductor-multiple-output power supply circuit that adjusts the output power by reducing a power supply current on at least some of the one or more power supply rails.

7. The system according to claim 1, further comprising a sequencer that schedules operations to be performed in a sequence that reduces a temporary current spike to reduce power consumption of the one or more computing resources.

8. The system according to claim 7, wherein the sequencer is implemented in a state machine.

9. A method for controlling power to computing resources, the method comprising:
    in response to obtaining parameters comprising at least one of a hardware-related parameter and a machine learning configuration parameter for one or more computing resources that perform memory access steps to process layers of a neural network, using at least some of the parameters to determine a metric that at least partially represents a number of the memory access steps performed by the one or more computing resources;
    using the metric as an estimate representative of a power consumption of the one or more computing resources; and
    controlling power to one or more power rails to reduce the power consumption by the one or more computing resources.

10. The method according to claim 9, further comprising using the metric to adjust one or more machine learning configuration parameters of the one or more computing resources.

11. The method according to claim 10, wherein the one or more machine learning configuration parameters comprise at least one of a type or a number of computational operations.

12. The method according to claim 9, wherein the hardware-related parameter comprises measured data that comprises at least one of a clock speed or sensor data sensor wherein the sensor data comprises at least one of a current, a voltage, a temperature, or an environmental parameter.

13. The method according to claim 12, further comprising using at least some of the measured data to adjust an output power at the one or more power rails to exceed a threshold while maintaining a safety margin associated with the measured data.

14. The method according to claim 9, wherein reducing the power consumption comprises using a feedback signal from the one or more power rails to adjust a clock speed.

15. The method according to claim 9, wherein controlling the one or more power rails comprises using a sequencer to schedule operations to be performed in a sequence that reduces temporary power spikes or slows a rising in current.

16. The method according to claim 9, wherein the memory access steps comprise at least one of a number of read, write, store, or retrieve operations.

17. The method according to claim 9, wherein using the metric as the estimate representative of the power consumption of the one or more computing resources comprises calculating at least one of clock cycles or a processing time.

18. The method according to claim 9, wherein the one or more power rails are coupled to a single-inductor-multiple-output power supply.

19. The method according to claim 9, wherein at least some of the parameters are provided to the one or more power rails in a feedback configuration.

20. The method according to claim 9, wherein controlling the one or more power rails comprises setting at least one of the one or more computing resources into a low-power mode.

\* \* \* \* \*